US008840015B2

(12) United States Patent
Baker et al.

(10) Patent No.: US 8,840,015 B2
(45) Date of Patent: Sep. 23, 2014

(54) METHOD AND APPARATUS FOR FACILITATING CHARITABLE DONATIONS

(76) Inventors: Lynlee Caron Baker, Oakton, VA (US); Elizabeth Thomas Dold, Fairfax, VA (US)

(*) Notice: Subject to any disclaimer, the term of this patent is extended or adjusted under 35 U.S.C. 154(b) by 896 days.

(21) Appl. No.: 11/874,827

(22) Filed: Oct. 18, 2007

(65) Prior Publication Data

US 2008/0033855 A1    Feb. 7, 2008

Related U.S. Application Data

(63) Continuation-in-part of application No. 11/367,796, filed on Mar. 2, 2006, now Pat. No. 7,770,788.

(60) Provisional application No. 60/657,872, filed on Mar. 3, 2005, provisional application No. 60/733,773, filed on Nov. 7, 2005, provisional application No. 60/862,024, filed on Oct. 18, 2006.

(51) Int. Cl.
*G06Q 40/00*    (2012.01)
*G06Q 30/02*    (2012.01)

(52) U.S. Cl.
CPC ............... *G06Q 30/02* (2013.01); *G06Q 40/00* (2013.01)
USPC .......................................................... 235/379

(58) Field of Classification Search
CPC ..... G06Q 20/10; G06Q 20/108; G06Q 30/02; G06Q 40/00; G06Q 20/202; G06Q 30/0205; G07F 19/20; G07F 19/202; G07F 5/24; G07F 19/201; G07F 11/00
USPC .................................. 235/379, 380; 705/540
See application file for complete search history.

(56) References Cited

U.S. PATENT DOCUMENTS

| 5,620,079 | A | 4/1997 | Molbak |
| 5,799,767 | A | 9/1998 | Molbak |
| 6,253,998 | B1* | 7/2001 | Ziarno .......................... 235/380 |
| 2002/0075149 | A1* | 6/2002 | Goodwin et al. ............. 340/540 |
| 2002/0111904 | A1 | 8/2002 | Gruber et al. |
| 2002/0174063 | A1* | 11/2002 | Major .............................. 705/39 |
| 2003/0225689 | A1* | 12/2003 | MacFarlane et al. ......... 235/379 |
| 2005/0021353 | A1 | 1/2005 | Aviles et al. |
| 2005/0114146 | A1* | 5/2005 | Barkley ............................ 705/1 |
| 2005/0251485 | A1 | 11/2005 | Quigley |
| 2007/0078766 | A1 | 4/2007 | Thomas |
| 2009/0018959 | A1 | 1/2009 | Doran |

OTHER PUBLICATIONS

"Non-Profit Partners", Coinstar: Donate Change, http://www.constar.com/us/html/A2-1, downloaded Aug. 20, 2006., pp. 1-3.

(Continued)

*Primary Examiner* — Thien T Mai

(57) ABSTRACT

A method, apparatus, and system for placing and operating an automated donation station is disclosed. An automated donation station can be placed at a location upon receiving a request for an automated donation station from a charitable organization or event organizer. The automated donation station can be customized according to a particular requestor's needs. One or more donations may be collected using the donation station by displaying information to a donor, receiving a donation offer from the donor, and collecting donation details (e.g., payment information) from the donor. A donation receipt can be dispensed to the donor at the automated donation station. Further, donation gifts may be selected by the donor at the automated donation station and dispensed at the automated donation station.

27 Claims, 8 Drawing Sheets

(56) References Cited

OTHER PUBLICATIONS

"Coins that Count Donation Program", Coinstar: Donate Change, http://coinstar.com/us/html/A2, downloaded Aug. 20, 2006, p. 1.
"Fundraising", Coinstar: Donate Change, http://coinstar.com/us/html/A2-3, downloaded Aug. 20, 2006, pp. 1-2.
The Island Packet, Comic, re "Giving Kiosk", Oct. 18, 2006.
Fausset, "Passing the Plate with Plastic", Los Angels Times, Oct. 7, 2006, pp. 1-5 pages.
"How Does It Work?", SecureGive, http://www.securegive.com/products.html, downloaded Nov. 19, 2006, pp. 1-2.

* cited by examiner

1

METHOD AND APPARATUS FOR FACILITATING CHARITABLE DONATIONS

CROSS-REFERENCE TO RELATED APPLICATIONS

This application is a continuation-in-part of U.S. patent application Ser. No. 11/367,796, filed Mar. 2, 2006 now U.S. Pat. No. 7,770,788, and entitled "METHOD AND SYSTEM FOR CREATING AND DELIVERING GROUP MESSAGES," which is hereby incorporated by reference herein, which in turn claims the benefit of priority from (i) U.S. Provisional Patent Application No. 60/657,872, filed Mar. 3, 2005, and entitled "METHOD AND APPARATUS FOR FACILITATING CHARITABLE DONATIONS," which is hereby incorporated by reference herein; and (ii) U.S. Provisional Patent Application No. 60/733,773, filed Nov. 7, 2005, and entitled "METHOD AND SYSTEM FOR CREATING AND DELIVERING GROUP MESSAGES," which is hereby incorporated by reference herein.

This application also claims priority of U.S. Provisional Patent Application No. 60/862,024, filed Oct. 18, 2006, and entitled "METHOD AND APPARATUS FOR FACILITATING CHARITABLE DONATIONS," which is hereby incorporated by reference herein.

BACKGROUND OF THE INVENTION

1. Field of the Invention

The invention relates to the collection and facilitation of charitable donations for a charity, corporate sponsor, or other type of sponsor and, more particularly, to the automated collection of charitable donations using a portable, configurable electronic apparatus.

2. Description of the Related Art

The collection of charitable donations often involves the employment of a large number of volunteers or paid workers and time. For example, the collection of donations at a charitable event may require a staff of persons to extract promises to donate, collect donor information, and perform a wide variety of administrative tasks including processing donor payments, preparing tax receipts, distributing gifts or rewards to donors, and mailing acknowledgment letters to donors and donation recipients.

Thus, conventional methods of collecting charitable donations and the attendant administrative tasks are often expensive, time-consuming, and labor-intensive, often reducing the net value of the received donation. In fact, many charities have found themselves in the unfortunate position of having to justify the reasons for having to spend substantial portion of moneys collected on administrative costs.

Accordingly, conventional approaches to the collection of charitable donations, distribution of gifts or rewards to donors, and attendant administrative tasks are economically inefficient, which is a disservice to charitable organizations and the people who depend on them for aid. Thus, there is a need for improvements in the collection of charitable donations and associated administrative tasks and also a means to facilitate and encourage charitable giving and charitable distribution.

SUMMARY OF THE INVENTION

The invention relates to the collection and facilitation of charitable donations for a charity, corporate sponsor, or other type of sponsor. In one embodiment, the invention relates to automated collection of charitable donations using a portable, configurable electronic apparatus.

In one embodiment, the invention pertains to a method, apparatus, and system for collecting charitable donations, managing the distribution of donor rewards including items or services purchased from a charity, streamlining the preparation of donor receipts including tax receipts, preparing reports of donations for charities, and/or the mailing of letters associated with the collection of donations, including, but not limited to: letters thanking donors, informational letters detailing the specifics of donations made in the name of others, and/or letters informing intended donors of moneys collected.

Although the invention is largely described as associated with a charity, the invention can be suitable for any individual, organization, association or other entity. The invention can also serve to promote or distribute goodwill (e.g., the promotion of a sponsor's goodwill and/or the distribution to those in need).

An electronic apparatus, hereinafter a donation station (also referred to as "The Charity Box") facilitates a user in making a charitable donation. The electronic apparatus can provide a self-help station whereby a user can utilize the automated donation station to make a donation to a charity.

In one embodiment, the donation station incorporates a display, including one or more charity name selections, and a payment election form for making donations, a change dispenser, and a printer to dispense a printed receipt. The donation station can accept a variety of donation types including cash and electronic debit/credit cards.

Optionally, the electronic apparatus may also dispense to the user, hereinafter the donor or donee, a token, charm (as referred to as "Charity Charms"), prepaid (gift) card, admission pass, prayer card, other item that designates support for the selected charity or aids the donor or donee (which may vary based on the donation amount). The dispensed item can also be a care card (including the ability to engrave/customize the card with the donee name to make the card nontransferable (including optional identification technology (e.g., fingerprinting)), or charitable donation cards as described in U.S. Provisional Patent Application No. 60/974,739, filed Sep. 24, 2007, entitled "CARE CARD," and which is hereby incorporated by reference herein. In one embodiment, the electronic apparatus may include a distribution means (and contribution amount) that is geared to children (e.g., game, crane, spiral display, slot machine arm, etc.). In another embodiment, the electronic apparatus can dispense the item without requiring the recipient to make a donation, such as when a charity, sponsor or other entity/person funds the items.

The electronic apparatus can be capable for inside use, outside use or both. Further, if desired, the exterior of the electronic apparatus can be customized to reflect a specific charity (e.g., name of charity and promotional event).

To make a donation via the donation station, a donor inserts cash or swipes their debit/credit card. The donor can then interact with the donation station to select a desired charity and a donation amount. Optionally, when the donation station also provides the donor with a token, charm or other item, the donor might be permitted to select a desired item to be dispensed. As a result of these selections, the donation will be electronically processed. The processing of the donation can be performed locally at the donation station, remotely at a server computer, or some combination of both. In the case of an electronic transfer of funds via a debit/credit card, one or more server computers are typically used in processing the transaction. The donation station can then print a receipt for the donor. Optionally, when the donation station also provides the donor with a token, charm or other item, the selected item can also be dispensed to the donor.

In one embodiment, the donation station can have a form factor or configuration similar to a portable automatic teller machine (ATM) or a vending machine. Typically, but not necessarily, the donation station will be relatively mobile like a vending machine, such that it can be relocated to different locations.

In one embodiment, the donation station can be configured to accept charitable donations for one or a number of charities. The donation station could have an electronic display and would accept cash or debit/credit cards as payment, and a printed receipt would be provided for each transaction. The printed receipt can indicate the name of the charity, the date, the amount of the contribution, and the cardholder's name. In one implementation, this donation station can resemble an ATM but be used for the purpose of making charitable contributions.

If a contribution is in excess of $250 (or some other predetermined amount), then the donation station may also prompt the taxpayer to indicate their mailing address to be used by the charity to issue a formal acknowledgement of the contribution, if mandated by the Internal Revenue Service (IRS).

In another embodiment, the donation station would be designed more like a traditional vending machine (i.e., one that can dispense a selected item). Here, the donor could choose not only the particular charity to give a donation to, but also have that donation tied to a specific item displayed in the donation station. For example, the item in the donation station is for an event or cause, the donation can be tied to the particular event or cause. The donation station can then print the donor a receipt (which can serve as a tax receipt). Additionally, if the donation station also provides an item to the donor, then the donation station can also dispense the item to the donor. If the item has a non-trivial monetary value, then the donation station can reduce the amount of the contribution by the fair market value of the item. The receipt being provided for tax purposes can also indicate this adjustment. The donation station can also inform the donor of this adjustment prior to making the contribution. For example, the donation station could display individualized charms for each charity or a single charm (or other item, e.g., toy) for various contribution levels.

The donation station could also be used at both a semi-permanent location (e.g., grocery store, shopping mall, hospital, airport, churches, funeral home, doctor's office, department store, and corporate headquarters) and/or temporary locations to support a particular fundraising event. The items dispensed (and any packaging), if any, can be designed specifically for distribution in such donation station. For example, the donation station could be leased to the United Way to support a specific fundraising event (e.g., line street corners of a walkathon event with donation stations). Another application would be for the donation station to be placed temporarily at a business location where that business is sponsoring a fundraising event. For example, if MacDonald's and American Cancer Society co-sponsor a Cancer Awareness Day, the donation station could be placed in all participating MacDonald's restaurants for the day.

The donation station can not only facilitate charitable giving but also serve as a marketing tool for charities or sponsors to promote their cause or goodwill and gain valuable exposure. The donation station can also be customized to carry or display marketing information, including charity and sponsor information. The charity information can also be information about the mission of the charity, its goals or its programs. The marketing information can also be unrelated to the charity or sponsor.

Two specific additional uses that the donation station can be used for (1) sale of insurance (e.g., breast cancer insurance, other types of cancer insurance (including related health or life benefits), travel insurance and pet insurance), using the vending machine model, and (2) church donations, using either the vending machine model (dispensing church related items) or the ATM model. For sale of insurance, to the extent permitted by law, in exchange for payment of a premium in the form of cash or a debit/credit card, the machine could dispense an insurance contract between the insurance company and the user to provide the specified insurance protection for the specified period of time (e.g., 1-year term insurance, with additional required premiums to have the policy remain in force). The electron apparatus will have the ability to: (1) accept the user's personal information, such as their name and address; (2) prompt the user to input answers to any underwriting questions; (3) briefly explain the insurance coverage and limitations; (4) dispense an "insurance card"; (5) indicate the user's name, address, and date the policy (at the current date) (and any other legally required information); and (6) accept the premium through cash and/or electronic payment. The donation station may have the ability to retrieve underwriting information from the Medical Information Bureau (MIB).

For church donations, the individual may be given two receipts—one for the collection bin (which states "church" copy) and the second one for the participant to retain for their records. If the donation station is used to meet a specific target of contributions level, then the computerized display screen could indicate the target contribution and show the ongoing total of contributions made to the machine (or collection of machines).

The invention can be implemented in numerous ways, including as a method, system, device, apparatus (including graphical user interface), or computer readable medium. Several embodiments of the invention are discussed below.

As a method for placing an automated donation station, one embodiment of the invention includes at least the acts of: receiving a request for an automated donation station at a particular location, and placing the automated donation station at the particular location.

As a method for configuring an automated donation station, one embodiment of the invention includes at least the acts of: receiving a request to customize an automated donation station, customizing the automated donation station, and placing the automated donation station.

As a method for processing donations at an automated donation station, one embodiment of the invention includes at least the acts of receiving a plurality of donations at an automated donation station, storing the plurality of donations at the automated donation station, and processing the plurality of donations.

As a method for accepting a donation at an automated donation station, one embodiment of the invention includes at least the acts of: displaying information to a donor, receiving a donation offer from the donor, collecting donation details from the donor, and dispensing a donation receipt to the donor.

As a method for processing charitable donations, one embodiment of the invention includes at least the acts of: collecting a plurality of donations at an automated donation station, and processing the collected donations.

As a method for operating a network of charitable donation stations, one embodiment of the invention includes at least the following phases: a donation station configuration phase, a donation station placement phase, a donation station donation phase, a donation station acceptance phase, a donation station processing phase, and a donation station servicing phase.

One embodiment of invention includes an apparatus containing at least a donation station controller, a user input device, a display, and a donation collection mechanism.

Still another embodiment of the invention is a donation station network, including at least a computer network and a plurality of automated donation stations coupled to the network.

Other aspects and advantages of the invention will become apparent from the following detailed description taken in conjunction with the accompanying drawings which illustrate, by way of example, the principles of the invention.

DETAILED DESCRIPTION OF THE INVENTION

Figure 1:
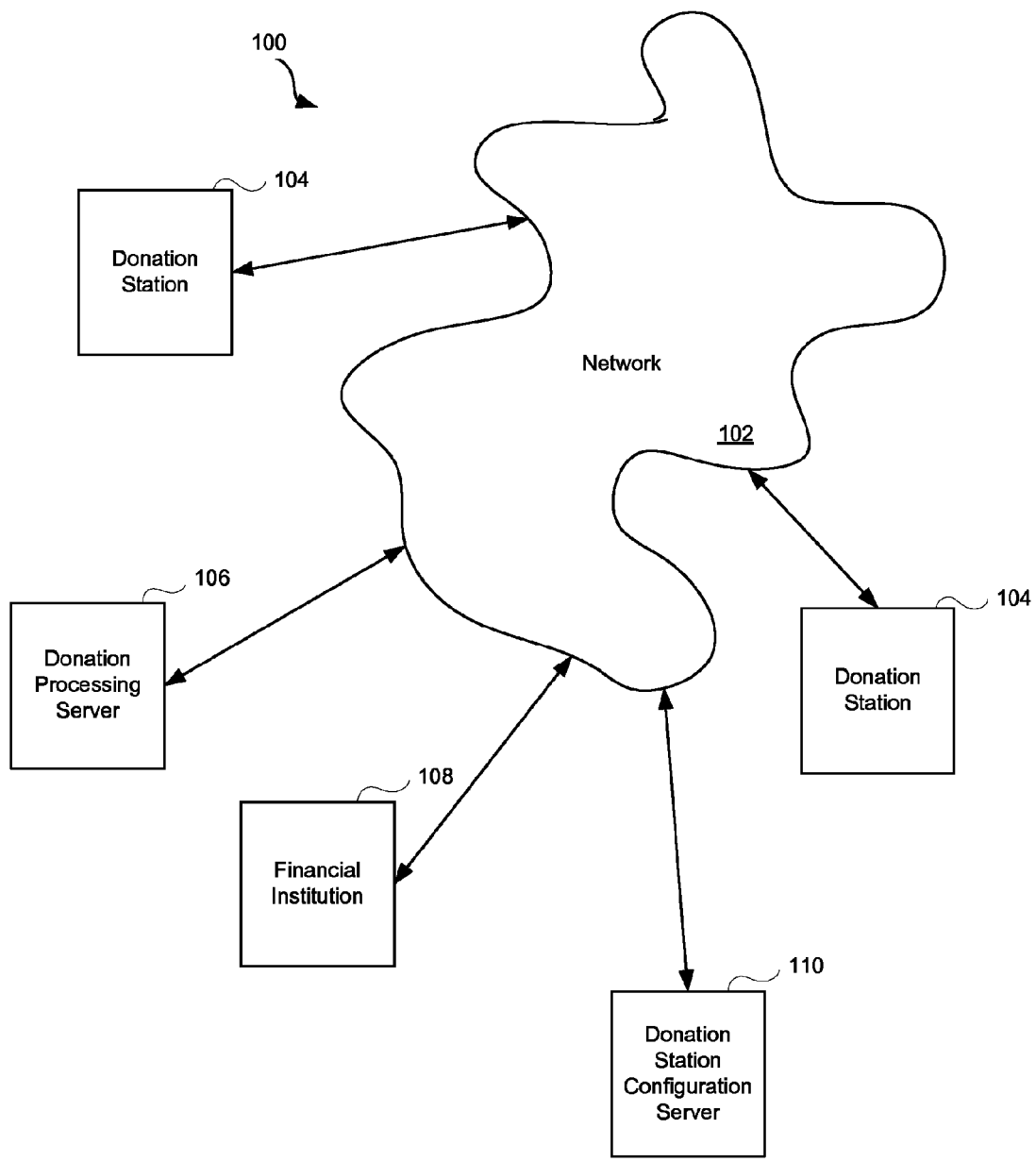
FIG. 1 is a block diagram of a donation collection system according to one embodiment of the invention.

The invention relates to the collection and facilitation of charitable donations for a charity, corporate sponsor, or other type of sponsor. In one embodiment, the invention relates to automated collection of charitable donations using a portable, configurable electronic apparatus.

In one embodiment, the invention pertains to a method, apparatus, and system for collecting or facilitating charitable donations, managing the distribution of donor rewards including items or services purchased from a charity, streamlining the preparation of donor receipts including tax receipts, preparing reports of donations for charities, and/or the mailing of letters associated with the collection of donations, including, but not limited to: letters thanking donors, informational letters detailing the specifics of donations made in the name of others, and/or letters informing intended donors of moneys collected.

Although the invention is largely described as associated with a charity, the invention can be suitable for any individual, organization, association or other entity. The invention can also serve to promote or distribute goodwill (e.g., the promotion of a sponsor's goodwill and/or the distribution to those in need).

An electronic apparatus, hereinafter a donation station (also referred to as "The Charity Box") facilitates a user in making a charitable donation. The electronic apparatus can provide a self-help station whereby a user can utilize the automated donation station to make a donation to a charity.

In one embodiment, the donation station incorporates a display, including one or more charity name selections, and a payment election form for making donations, a change dispenser, and a printer to dispense a printed receipt. The donation station can accept a variety of donation types including cash and electronic debit/credit cards.

Optionally, the electronic apparatus may also dispense to the user, hereinafter the donor or donee, a token, charm (as referred to as "Charity Charms"), prepaid (gift) card, admission pass, prayer card, other item that designates support for the selected charity or aids the donor or donee (which may vary based on the donation amount). The dispensed item can also be a care card (including the ability to engrave/customize the card with the donee name to make the card nontransferable (including optional identification technology (e.g., fingerprinting)), or charitable donation cards as described in U.S. Provisional Patent Application No. 60/974,739, filed Sep. 24, 2007, entitled "CARE CARD," and which is hereby incorporated by reference herein. In one embodiment, the electronic apparatus may include a distribution means (and contribution amount) that is geared to children (e.g., game, crane, spiral display, slot machine arm, etc.). In another embodiment, the electronic apparatus can dispense the item without requiring the recipient to make a donation, such as when a charity, sponsor or other entity/person funds the items.

The electronic apparatus can be capable for inside use, outside use or both. Further, if desired, the exterior of the electronic apparatus can be customized to reflect a specific charity (e.g., name of charity and promotional event).

To make a donation via the donation station, a donor inserts cash or swipes their debit/credit card. The donor can then interact with the donation station to select a desired charity and a donation amount. Optionally, when the donation station also provides the donor with a token, charm or other item, the donor might be permitted to select a desired item to be dispensed. As a result of these selections, the donation will be electronically processed. The processing of the donation can be performed locally at the donation station, remotely at a server computer, or some combination of both. In the case of an electronic transfer of funds via a debit/credit card, one or more server computers are typically used in processing the transaction. The donation station can then print a receipt for the donor. Optionally, when the donation station also provides the donor with a token, charm or other item, the selected item can also be dispensed to the donor.

In one embodiment, the donation station can have a form factor or configuration similar to a portable automatic teller machine (ATM) or a vending machine. Typically, but not necessarily, the donation station will be relatively mobile like a vending machine, such that it can be relocated to different locations.

In one embodiment, the donation station can be configured to accept charitable contributions for one or a number of charities. The donation station could have an electronic display and would accept cash or debit/credit cards as payment, and a printed receipt would be provided for each transaction. The printed receipt can indicate the name of the charity, the date, the amount of the contribution, and the cardholder's name. In one implementation, this donation station can resemble an ATM but be used for the purpose of making charitable contributions.

If a contribution is in excess of $250 (or some other predetermined amount), then the donation station may also prompt the taxpayer to indicate their mailing address to be used by the charity to issue a formal acknowledgement of the contribution, if mandated by the Internal Revenue Service (IRS).

In another embodiment, the donation station would be designed more like a traditional vending machine (i.e., one that can dispense a selected item). Here, the donor could choose not only the particular charity to give a donation to, but also have that donation tied to a specific item displayed in the donation station. For example, the item in the donation station is for an event or cause, the donation can be tied to the particular event or cause. The donation station can then print the donor a receipt (which can serve as a tax receipt). Additionally, if the donation station also provides an item to the donor, then the donation station can also dispense the item to the donor. If the item has a non-trivial monetary value, then the donation station can reduce the amount of the contribution by the fair market value of the item. The receipt being provided for tax purposes can also indicate this adjustment. The donation station can also inform the donor of this adjustment prior to making the contribution. For example, the donation station could display individualized charms for each charity or a single charm (or other item, e.g., toy) for various contribution levels.

The donation station could also be used at both a semi-permanent location (e.g., grocery store, shopping mall, hospital, airport, churches) and/or temporary locations to support a particular fundraising event. The items dispensed (and any packaging), if any, can be designed specifically for distribution in such donation station. For example, the donation station could be leased to the United Way to support a specific fundraising event (e.g., line street corners of a walkathon event with donation stations). Another application would be for the donation station to be placed temporarily at a business location where that business is sponsoring a fundraising event. For example, if MacDonald's and American Cancer Society co-sponsor a Cancer Awareness Day, the donation station could be placed in all participating MacDonald's restaurants for the day.

The donation station can not only facilitate charitable giving but also serve as a marketing tool for charities or sponsors to promote their cause or goodwill and gain valuable exposure. The donation station can also be customized to carry or display marketing information, including charity and sponsor information. The charity information can also be information about the mission of the charity, its goals or its programs. The marketing information can also be unrelated to the charity or sponsor.

Two specific additional uses that the donation station can be used for (1) sale of insurance (e.g., breast cancer insurance, other types of cancer insurance (including related health or life benefits), travel insurance and pet insurance), using the vending machine model, and (2) church donations, using either the vending machine model (dispensing church related items or token) or the ATM model. For sale of insurance, to the extent permitted by law, in exchange for payment of a premium in the form of cash or a debit/credit card, the machine could dispense an insurance contract between the insurance company and the user to provide the specified insurance protection for the specified period of time (e.g., 1-year term insurance, with additional required premiums to have the policy remain in force). The electron apparatus will have the ability to: (1) accept the user's personal information, such as their name and address; (2) prompt the user to input answers to any underwriting questions; (3) briefly explain the insurance coverage and limitations; (4) dispense an "insurance card"; (5) indicate the user's name, address, and date the policy (at the current date) (and any other legally required information); and (6) accept the premium through cash and/or electronic payment. The donation station may have the ability to retrieve underwriting information from the Medical Information Bureau (MIB).

For church donations, the individual may be given two receipts—one for the collection bin (which states "church" copy) and the second one for the participant to retain for their records. If the donation station is used to meet a specific target of contributions level, then the computerized display screen could indicate the target contribution and show the ongoing total of contributions made to the machine (or collection of machines).

Embodiments of various aspects of the invention are discussed below with reference to FIGS. 1-7. However, those skilled in the art will readily appreciate that the detailed description given herein with respect to these figures is for explanatory purposes as the invention extends beyond these limited embodiments.

FIG. 1 is a block diagram of a donation collection system 100 according to one embodiment of the invention. The donation collection system 100 facilitates the collection of charitable or other donations as well as processing electronic donations through financial institutions. The processing of electronic donations can include credit cards, debit cards, ATM cards, electronic checks, wire transfers, online bill payment services, and other electronic money transfers such as PayPal™.

The donation collection system 100 includes a network 102. The network 102, for example, is a data network. The network 102 can pertain to a local area network (LAN), a wide area network (WAN), and/or a global network (e.g. the Internet). Various networking technologies can be utilized, including but not limited to Ethernet, cable, telephone modems, WiFi, WiMax, and Bluetooth™.

The donation collection system 100 also includes one or more donation stations 104 coupled to the network 102. The donation collection system 100 can also include one or more donation processing servers 106 that can couple to the network 102. Additionally, one or more financial institutions 108 may be accessible via the network 102. The donation processing servers 106 can process financial transactions such as donations made using some form of electronic payment, for example a credit card, at the financial institutions 108. A donation configuration server 110 can also be coupled to the network 102. The donation configuration server 110 can be used to remotely access the donation stations 104 in order to upload or download information, for example, fundraiser totals, messages from charities and or donation recipients, and electronic bulletins or newsletters. The donation configuration server 110 can also receive maintenance or service requests from malfunctioning donation stations 104 or donation stations 104 that have run low on depletable supplies such as printer paper.

In one embodiment of the invention, the donation configuration server 110 can be a portable computing device such as a laptop or PDA (not shown) that is connected directly to a donation station 104, for example by a service technician, as part of a regularly scheduled maintenance plan. Similarly, in one embodiment of the invention, the donation stations 104 are free-standing (i.e., not connected to the network 102) and the donation processing server 106 may receive data from the donation stations 104 via some intermediary device, not shown. This intermediary device could be, for example, a laptop or PDA computer which has been used to download electronic donations directly from a donation station 104 (e.g., through a service port on the donation station 104). Alternately, a memory storage device, such as a hard drive, flash drive, or other computer readable medium can be used to transfer information manually between the donation station 104 and the donation processing server.

Figure 2:
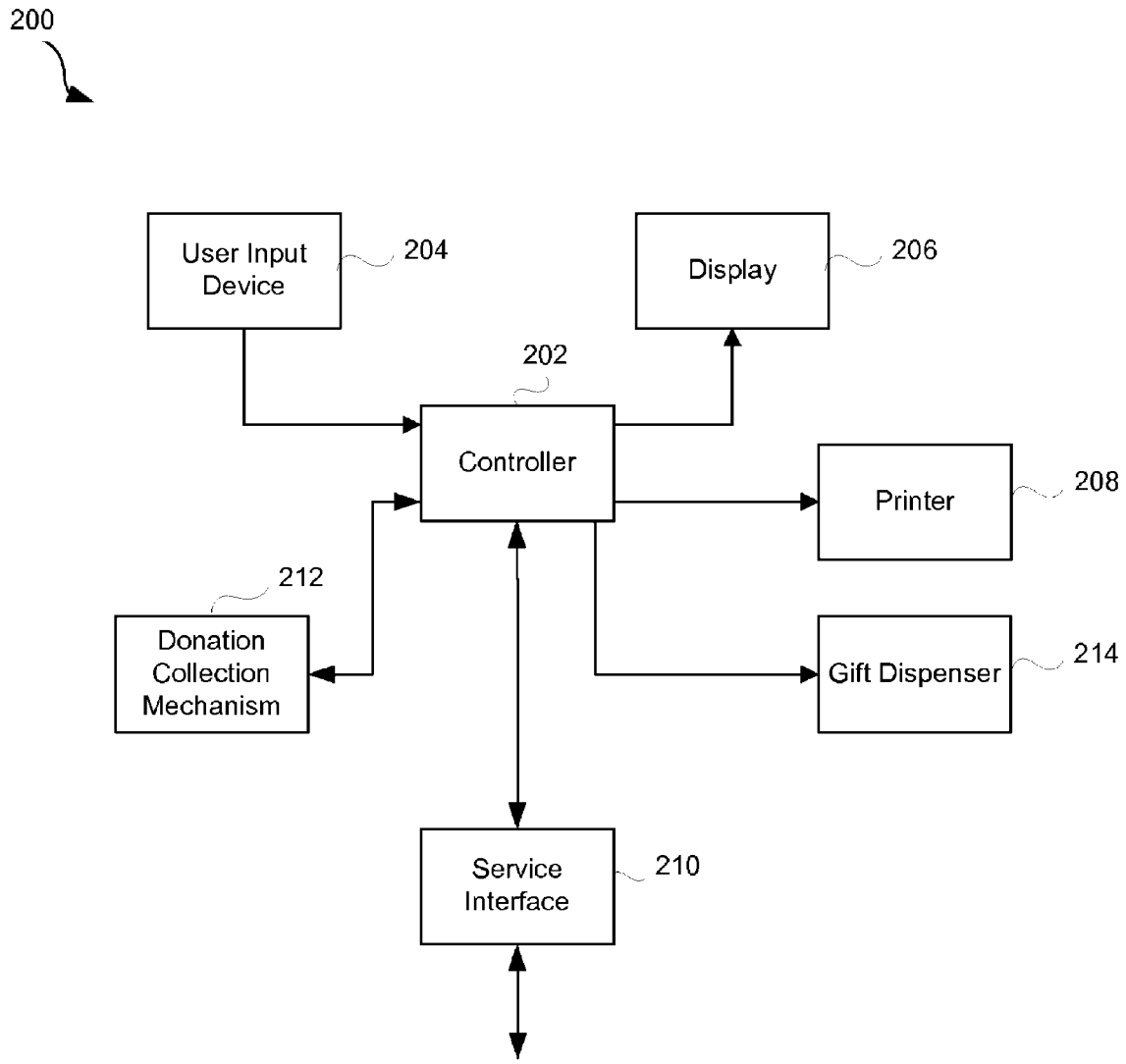
FIG. 2 is a block diagram of an electronic apparatus for collecting charitable donations according to one embodiment of the invention.

FIG. 2 is a block diagram of a donation station 200 according to one embodiment of the invention. The donation station 200 can, for example be a donation station 104 as described in reference to FIG. 1. As noted above, the donation station 200 may be configured as an ATM style device, at which donors make charitable donations. The donation station 200 includes a controller 202 which integrates the various components of the donation station 200. The controller 202 can be, for example, a computing device, such as a personal computer. A user input device 204 is used to interact with the donation station 200, typically for the purpose of obtaining information about a charity or to make a donation. The user input device 204 can be a computer touch screen, or any combination of traditional input/output devices (e.g., keyboards, trackballs, touchpads, computer mouses, keypads, and monitors.) A computer display 206 is used to display options and information to a user. A printer 208 is connected to or built in to the donation station 200. The printer 208 is used, for example, to print tax receipts, acknowledgments, brochures, and reports. A service interface 210 is used to access the donation station 200. The service interface 210 can include a network connection, computer storage device, or other interface port as described above in reference to FIG. 1. A donation collection mechanism 212 is used to collect donations in cash or bank checks, or to read debit, credit or ATM cards. A gift dispenser 214 can be included in the donation station 200. In one embodiment of the invention, where the donation station 200 is configured similarly to a vending machine, a variety of donation gifts may be dispensed by the gift dispenser 214. In another embodiment of the invention, a small token may be dispensed at the gift dispenser 214 instead of a donation gift, the token being redeemable for a donation gift at some other time (e.g., by mail).

Figure 3:
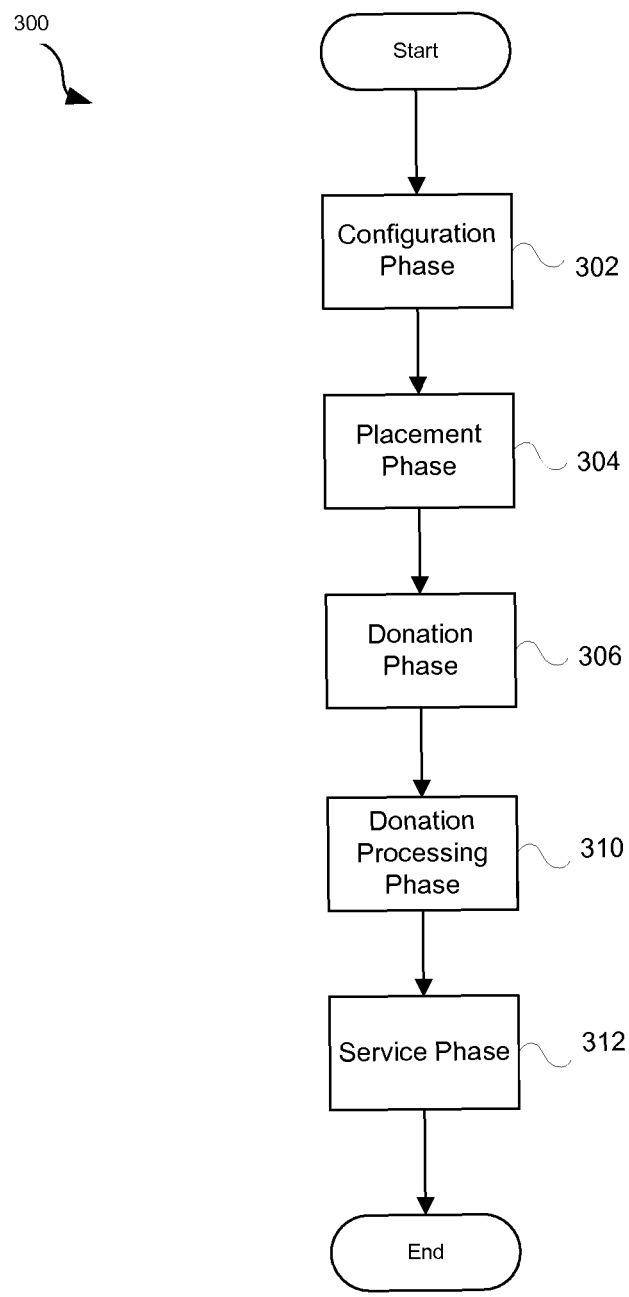
FIG. 3 is a flow diagram of a charitable donation station operation process according to one embodiment of the invention.

FIG. 3 is a donation station operation process 300 according to one embodiment of the invention. The donation station operation process 300 can be used, for example with the donation collection system of FIG. 1.

The donation station operation process 300 begins with a configuration phase 302, where one or more donation stations are configured or customized according to the needs of one or more charitable organizations. This configuration can include, among other things, setting up the donation station user interface, adding custom graphics and marketing materials to the donation station user-interface, customizing the exterior of the donation station with paint and/or graphics associated with a particular charitable organization or even, stocking the donation station with donation gifts to be given to donors as a reward for donating, and adding additional features as required. Examples of additional features might include the ability to accept cash or checks.

Next, the placement phase 304 occurs. During the placement phase 304, a configured donation station is delivered to a location as requested by a charitable organization. As noted above, this location might be a charity event, a church, or some other place that has agreed to allow the charity to accept donations, for instance a supermarket or shopping mall.

A donation phase 306 follows the placement phase. During the donation phase 306, donors donate money to one or more charitable organizations (or those in need) by operating a donation station. Depending on the configuration of the donation station, the donations can be in the form of cash (bills or coins), credit cards, debit cards, personal checks, etc. Some donation stations may be able to take other payment types, such as PayPal™ or wire transfers from a bank.

Next, the donation processing phase 310 occurs. During the donation processing phase 310, electronic donations are processed at corresponding financial institutions. For example, credit card donations are processed at credit card companies. The donation processing phase 310 can occur in batches (e.g., once a day) or immediately (i.e., as soon as the donor completes the transaction.)

Finally, a donation station servicing phase 312 occurs. Servicing a donation station can include any number of service types, for example, replacing depletable supplies such as printer paper, removing cash donations from the donation station, changing batteries, updating charity information, and/or recovering the donation station at the end of a event or term.

The various stages in the donation station operation process may be repeated any number of times and can occur in any order, as well as simultaneously. For example, the donation phase 306 and the 310 donation processing phase 310 could occur simultaneously, such as when a donation is electronically processed while a new donation is being received from a different donor. Simultaneously allowing the donation phase 306 and the donation processing phase 308 minimizes the time between the donation and the receiving of the donation by the donee charity.

Figure 4:
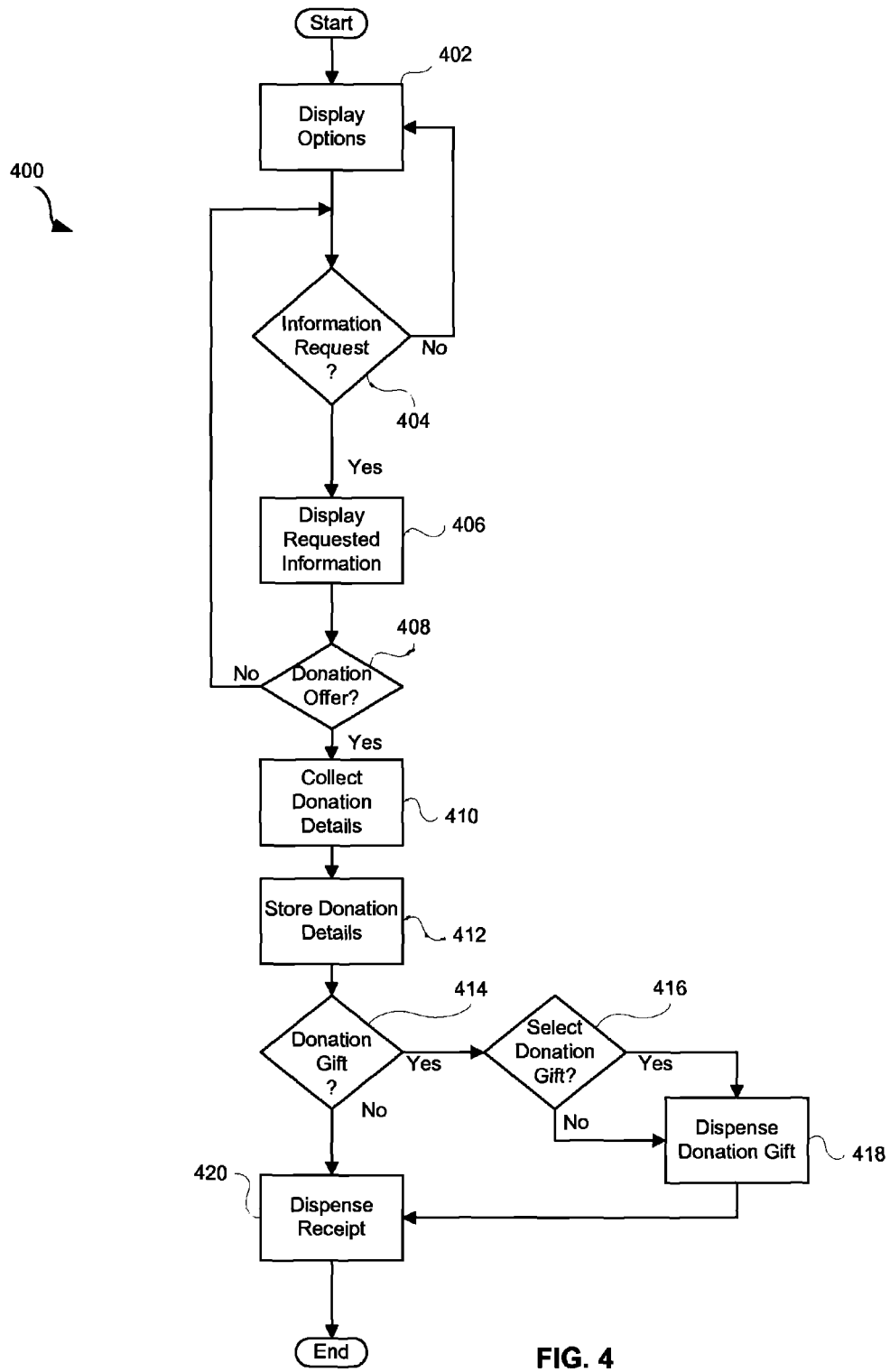
FIG. 4 is a flow diagram of a charitable donation collection process according to one embodiment of the invention.

FIG. 4 is a flow diagram of a donation collection process 400 according to one embodiment of the invention. The donation collection process 400 can, for example, utilize a donation station 200 as described in reference to FIG. 2.

The donation collection process 400 initially displays 402 options to a user (i.e., a potential donor). This display can include, for example, a menu of links to informational, marketing, or promotional material relevant to a particular charity. Next, decision 404 determines if the user has made an information request, such as a request to display a particular document shown in the menu. If decision 404 determines that an information request has been made, then the requested information is displayed 406. Next, a decision 408 determines if the user has offered to make a donation, for example by selecting a donation link that has been displayed in blocks 402 or 406. If decision 408 detects that a donation offer has been made, donation details, including at least donor information and donation amount, are collected 410, for example using a form filled out by the user or by reading a magnetic strip or computer chip on a credit/debit card. Other donation details may be collected, such as a message to the donee organization, or the name of a person in whose honor the donation is to be made. Further, the message can be added to a group message card as described in U.S. patent application Ser. No. 11/367,796 entitled "METHOD AND SYSTEM FOR CREATING AND DELIVERING GROUP MESSAGES," referenced above and incorporated herein by reference. Next, the donation details are stored 412, for example at a donation station where the donation was received or, alternately, at a remote location via a network 102 as described in reference to FIG. 1. Next, a decision 414 determines if the user has indicated a desire to receive a donation gift. For example, an item or token offered as an incentive to make a donation. In some cases, more than one gift will be available to the user, so a decision 416 determines if the user has indicated a desire to select a particular donation gift from among multiple choices. Next, the desired gift is dispensed 418 to the user.

The donation collection process 400 continues by dispensing 420 a receipt to the user, for example for tax deduction purposes. This receipt may deduct the value of any donation gifts dispensed 418 as a reward for the donation. Alternately, the receipt may be mailed to the user at a later time, depending on the user's preference (not shown).

Figure 5A:
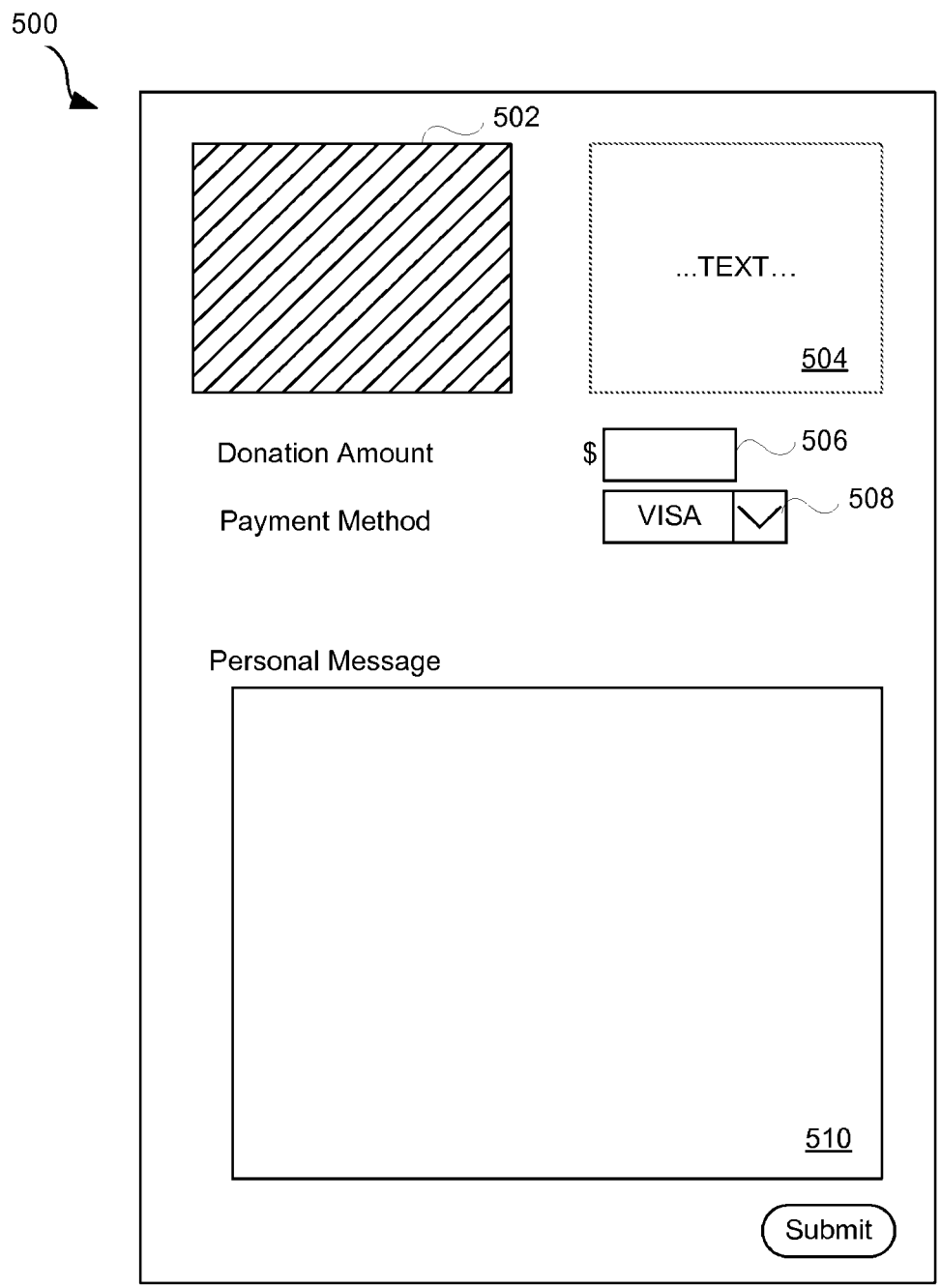
FIG. 5A shows an exemplary screen shot of a donation station user interface according to one embodiment of the invention.

FIG. 5A is a block diagram representing a donation collection form 500 according to one embodiment of the invention. The donation collection form 500 can be displayed, for example, as described in block 406 in reference to FIG. 4 above.

Donation collection form 500 can include pictures 502 (or graphics) and text 504 positioned anywhere on the page according to the page designer's preference. Pictures 502 can be logos, photographs, or diagrams relating to the charity or persons for whom the donations are being collected. Text 504 may be, for example, instructions to the donor, marketing materials, or legal matter. A donation amount field 506 is shown on the donation collection form 500. The donor enters the donation amount in the donation amount field 506. Next, a payment method field 508 is shown. Possible payment methods include, but are not limited to cash, coins, bank checks, travelers checks, credit or debit cards, ATM cards, electronic checks, wire transfers, online bill payment services, and other electronic money transfers such as PayPal™. Alternately, the payment method could be a promise to pay at a later date (i.e., a "Bill Me Later") option. If desired, a donor may leave a personal message in personal message field 510. Other entry fields can be included on the form as well, depending on the form designer's and the charity's needs. Finally, when the user has completed the form, a submit button 512 is pressed or selected, ending the donor's interaction with the donation collection form 500.

Figure 5B:
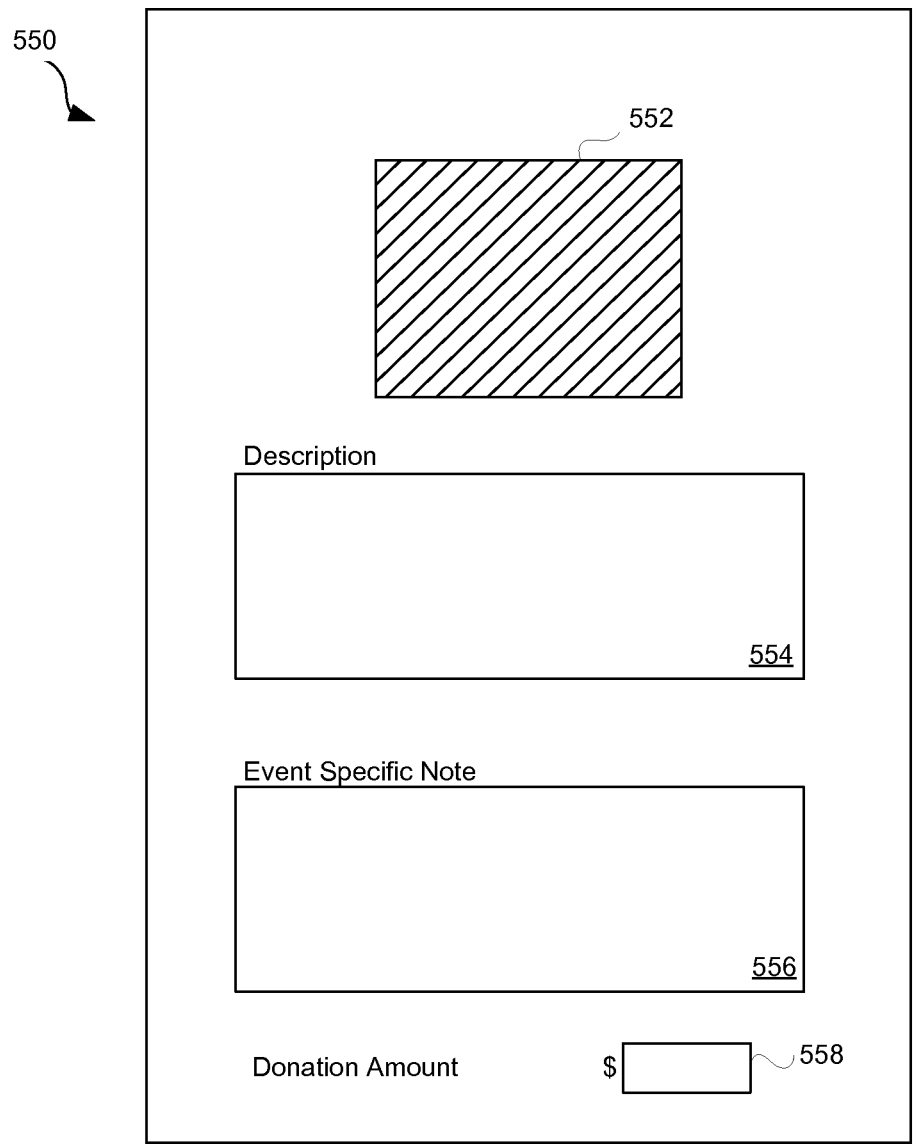
FIG. 5B shows an exemplary screen shot of a donation station user interface according to one embodiment of the invention.

FIG. 5B is a block diagram representing a donation collection form 550 according to one embodiment of the invention. The donation collection form 550 can be displayed, for example, as described in block 406 in reference to FIG. 4 above.

Donation collection form 550 can include a logo or picture 552 as described above in reference to FIG. 5A. The donation form 550 has a description field 554, which can contain a description of the charity, its goals, or other information. An event specific note 556 can be added as well. This note may be updated more frequently than the description field 554, and can contain status updates such as a current fundraiser goal or a dollar amount representing the amount of fundraising money gathered thus far. A donation amount field 558 is shown on the donation collection form 550. The donor enters the donation amount in the donation amount field 558.

Figure 6:
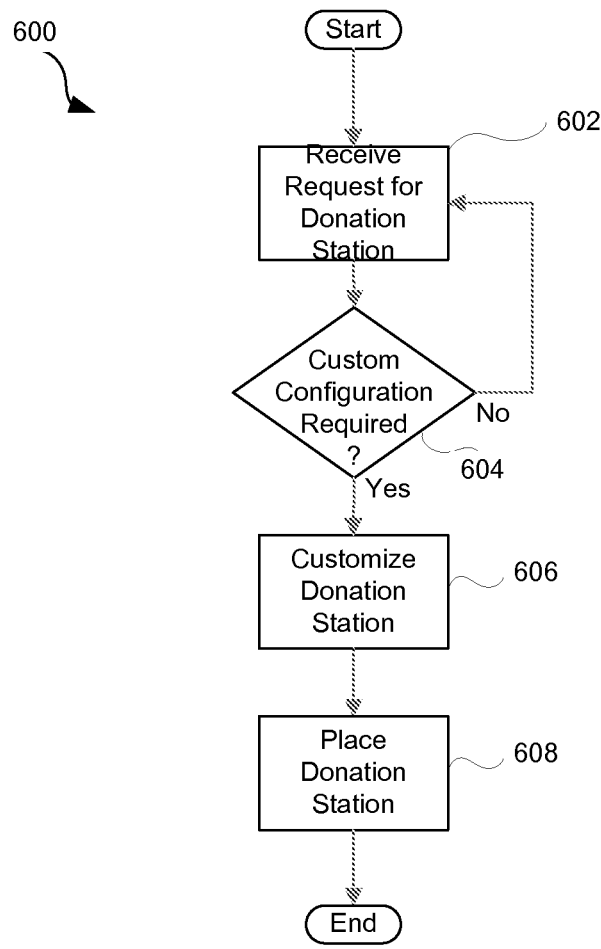
FIG. 6 is a flow diagram of a donation station customization process according to one embodiment of the invention.

FIG. 6 is a flow diagram of a donation station customization and placement process 600 according to one embodiment of the invention. Donation station customization and placement process 600 can be implemented such that customization is accomplished remotely, for example by a representative of a particular charity interacting with a customization application across a network. Alternately, customization may be done manually, by one or more designers or artists according to a charity's specification. The donation station customized and placed by process 600 can be the donation station 200 as described in reference to FIG. 2 above and may be free-standing or connected to a network 102 as described in reference to FIG. 1 above.

The donation station customization and placement process 600 begins with receiving 602 a request for a donation station. In one embodiment of the invention, the request is received at a web site on the Internet. Next, a decision 604 determines if a donation station is to be customized. Next, the donation station is customized 606. The customization 606 can include external customization, such as paint and graphics. Additionally, the donation station can be customized 606 to carry or display marketing information, including charity and sponsor information. The donation station user interface can be customized 606 as well, depending on the needs of a particular requester (e.g., the charitable organization that has requested the donation station). Next the donation station is placed 608 at the location designated by the requester.

Figure 7:
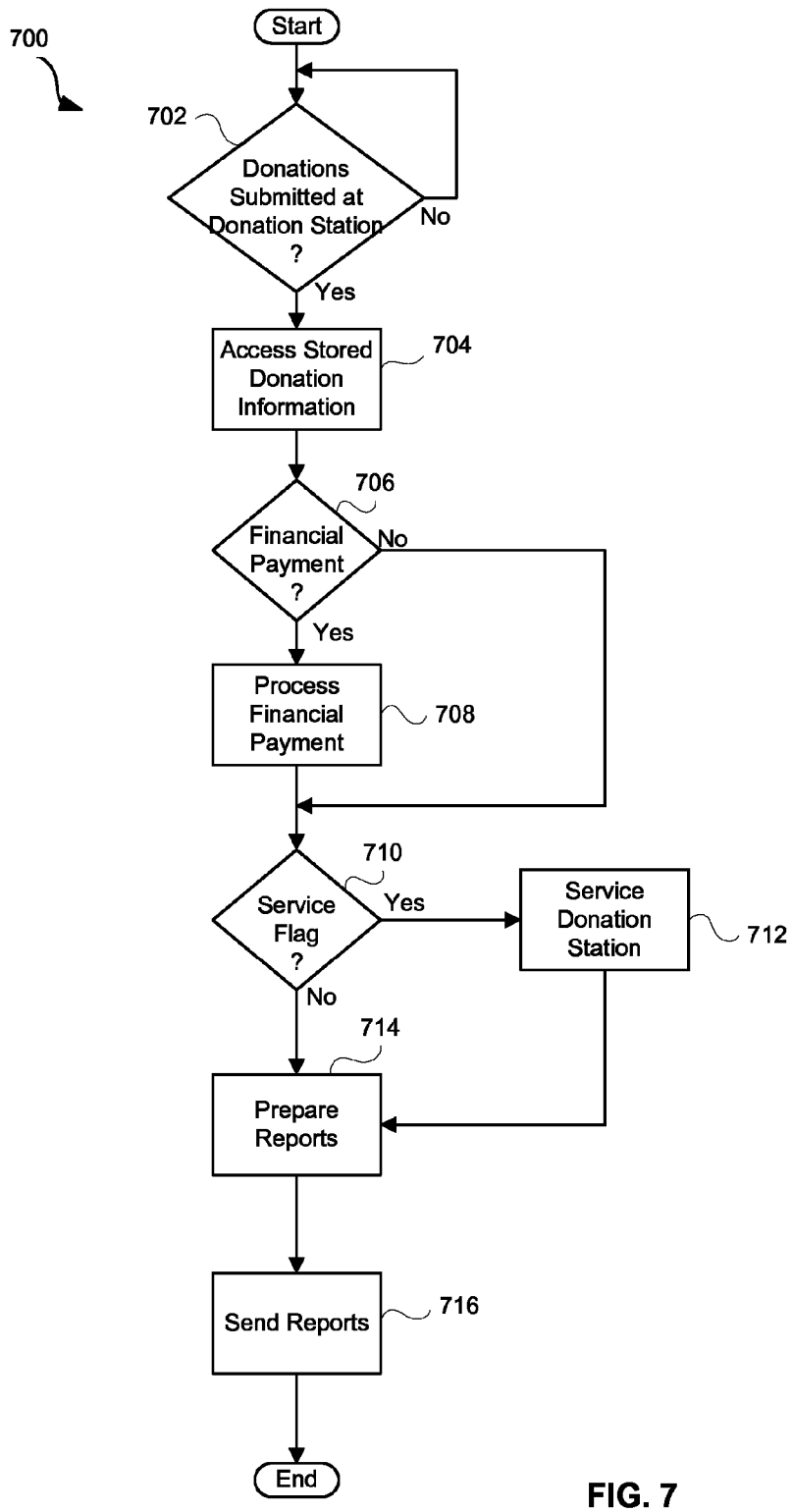
FIG. 7 is a flow diagram of a donation station servicing process.

FIG. 7 is a flow diagram of a donation station servicing process 700 according to one embodiment of the invention. Donation station servicing process 700 can be used, for example, to service a donation station placed using donation station and placement process 600 as described in reference to FIG. 6.

The donation station servicing process 700 begins with a decision 702 that determines if donations have been processed at a donation station (i.e., that one or more users have made a donation using that donation station.) Next, stored donation information relating to the previously processed donations is accessed 704. As noted previously in reference to FIG. 2, a donation station can have the capacity to take credit/debit cards or other electronic payments involving a financial institution rather than cash (financial payments). Decision 706 detects whether one or more of these financial payments have been made at the donation station. Any financial payments are then processed 708, typically by interacting with a financial institution associated with a particular payment method (i.e., banks and/or credit card companies.)

The donation station servicing process 700 continues with a decision 710 that determines if a service flag has been set at a donation station. The service flag indicates whether a particular donation station requires servicing. The service flag may indicate that a donation station is malfunctioning, for instance, or that a donation station has run out of storage space or depletable supplies such as of paper to print receipts. If service is required, then the donation station is serviced 712. Servicing 712 can be accomplished, for example by a technician or other trained user, or may be accomplished remotely, depending on the reason for the service flag.

Next, the donation station servicing process 700 prepares 714 reports. Possible reports include donor receipts including tax receipts, preparing reports of donations for charities, and/or the mailing of letters associated with the collection of donations, including, but not limited to: letters thanking donors, informational letters detailing the specifics of donations made in the name of others, and/or letters informing intended donors of moneys collected.

Finally, the donation station servicing process 700 sends 716 the prepared reports. Sending 716 can be electronic or by using some physical delivery method such as mail.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method for placing an automated donation station, said method comprising:
receiving, at a web site accessible via a computer network, an electronic request for an automated donation station at a particular location, wherein the electronic request includes or references information pertaining to a particular donation seeking organization or a particular donation seeking event;
configuring the automated donation station based at least in part on the information pertaining to the particular donation seeking organization or the particular donation seeking event, the information being included in or referenced by the electronic request that is received via the computer network; and placing the automated donation station at the particular location for collection of donations from donors interacting with the automated donation station.

2. A method as recited in claim 1, wherein the configuring of the automated donation station customizes at least one graphical user interface thereof to the particular donation seeking organization or the particular donation seeking event.

3. A method as recited in claim 1, wherein the automated donation station is an electronic kiosk.

4. A method for processing donations at an automated donation station, wherein said method comprises:

temporarily placing an automated donation station at a particular location for collection of donations from donors interacting with the automated donation station during a donation seeking event provided by a donation seeking organization;

receiving a plurality of donations via the automated donation station; and processing the plurality of donations, wherein receiving of each of the donations via the automated donation station includes at least:

displaying information to a donor via the automated donation station, the displayed information pertaining to the particular donation seeking organization or the particular donation seeking event;

receiving a donation offer from the donor; and collecting donation details from the donor, wherein, for at least one of the donations, the method further comprises:

displaying, via the automated donation station, an indication of a plurality of available donation gifts; and dispensing, via the automated donation station, at least one of the available donation gifts, selected in accordance with a selection received from the donor via the automated donation station, to the donor since the donor has provided the donation, and wherein the donation gift is a physical toy or charm.

5. A method as recited in claim 4, wherein said method further comprises:

storing donation data pertaining to the plurality of donations at the automated donation station for subsequent processing.

6. A method as recited in claim 5, wherein the processing of the received donations further comprises:

accessing the stored donation data; and processing financial payments associated with the stored donation data.

7. A method as recited in claim 6, wherein the financial payments are processed at a financial institution.

8. A method for processing donations at an automated donation station, wherein said method comprises:

temporarily placing an automated donation station at a particular location for collection of donations from donors interacting with the automated donation station during a donation seeking event provided by a donation seeking organization;

receiving a plurality of donations via an automated donation station; and processing the plurality of donations, wherein, for at least one of the donations, the method further includes at least:

displaying information to a donor via the automated donation station, the displayed information pertaining to the particular donation seeking organization or the particular donation seeking event;

receiving a donation offer from the donor;

collecting donation details from the donor;

displaying, via the automated donation station, an indication of a plurality of available donation gifts; and determining if the donor has selected via the automated donation station to receive at least one of the available donation gifts.

9. A method as recited in claim 8, wherein said method further comprises:

dispensing the donation gift at the automated donation station.

10. A method as recited in claim 8, wherein the method further comprises:

delivering the donation gift to the donor at a remote location.

11. A method as recited in claim 4, wherein the information displayed to the donor includes marketing information relating to a charity, wherein said method further comprises preparing a plurality of reports, and wherein said processing of the plurality of donations is accomplished over a network connection.

12. A method as recited in claim 4, further comprising:

determining if the automated donation station requires service; and servicing the automated service station.

13. A mobile automated donation station, comprising:

a donation station controller;

a user input device;

a display;

a customized graphical user interface configured to be presented on the display, the customized graphical user interface being customized to a particular donation seeking organization or a particular donation seeking event, the customized graphical user interface being configured to display an indication of a plurality of donation gifts; and a donation collection mechanism; and a donation gift selector configured to select and make available one of the plurality of donation gifts, the selection of the one of the plurality of donation (lifts being in accordance with a selection received from the donor via the mobile automated donation station.

14. A mobile automated donation station of claim 13, further comprising:

a donation station gift dispenser;

a printer; and a service interface.

15. A method as recited in claim 4, wherein said receiving of each of the donations via the automated donation station includes at least:

dispensing a donation receipt to the donor from the automated donation station.

16. A method as recited in claim 4, wherein said receiving of each of the donations via the automated donation station includes at least:

initiating sending a donation receipt to the donor via electronic mail.

17. A method for processing donations at an automated donation station, wherein said method comprises:

temporarily placing an automated donation station at a particular location for collection of donations from donors interacting with the automated donation station during a donation seeking event provided by a donation seeking organization;

receiving a plurality of donations via the automated donation station; and processing the plurality of donations, wherein said receiving of each of the donations via the automated donation station includes at least:

displaying information to a donor via the automated donation station, the displayed information pertaining to the particular donation seeking organization or the particular donation seeking event;

receiving a donation offer from the donor; and collecting donation details from the donor, and wherein said method further comprises:

displaying, via the automated donation station, an indication of a plurality of available donation gifts that are made available to the donor since the donor has provided the donation offer; and determining if the donor has selected, via the automated donation station, to receive at least one of the available donation gifts.

18. A method as recited in claim 17, wherein said method further comprises:

determining how the donor desires to receive the at least one available donation gift.

19. A method as recited in claim 17, wherein said method further comprises:

dispensing, via the automated donation station, the at least one available donation gift to the donor, if the donor desires to receive the at least one available donation gift.

20. A method as recited in claim 4, wherein said method further comprises:

dispensing, via the automated donation station, a donation receipt to the donor since the donor has provided the donation offer.

21. A method for processing donations at an automated donation station, wherein said method comprises:

temporarily placing an automated donation station at a particular location for collection of donations from donors interacting with the automated donation station during a donation seeking event provided by a donation seeking organization;

receiving a plurality of donations via the automated donation station; and processing the plurality of donations, wherein, for at least one of the donations received via the automated donation station, said method includes at least:

displaying information to a donor via the automated donation station, the displayed information pertaining to the particular donation seeking organization or the particular donation seeking event;

receiving a donation offer from the donor;

collecting donation details from the donor;

displaying, via the automated donation station, an indication of a plurality of available donation gifts that are made available to the donor since the donor has provided the donation offer;

determining if the donor has selected via the automated donation station to receive at least one of the available donation gifts;

providing at least one of the available donation gifts to the donor since the donor has provided the donation offer; and providing a donation receipt to the donor, the donation receipt identifying an adjusted donation amount in view of the donation gift, the donation receipt being different than the donation gift.

22. A method as recited in claim 21, wherein said providing of the donation receipt comprises:

dispensing the donation receipt to the donor from the automated donation station.

23. A method as recited in claim 22, wherein said providing of the at least one available donation gift comprises:

dispensing the donation gift to the donor from the automated donation station.

24. A method as recited in claim 21, wherein the donation gift is a non-monetary gift.

25. A method as recited in claim 21, herein the donation gift is a physical toy or charm.

26. A method as recited in claim 21, wherein the donation gift is a non-monetary gift.

27. A method as recited in claim 21, wherein the donation gift is associated with the donation seeking event or the particular donation seeking organization.

* * * * *